US012509901B2

(12) United States Patent
Yano

(10) Patent No.: US 12,509,901 B2
(45) Date of Patent: Dec. 30, 2025

(54) SHELTER FLOATING DEVICE

(71) Applicant: SHELTER JAPAN CO., Ltd., Shizuoka (JP)

(72) Inventor: Akihiko Yano, Shizuoka (JP)

(73) Assignee: SHELTER JAPAN CO., LTD., Shizuoka (JP)

( * ) Notice: Subject to any disclaimer, the term of this patent is extended or adjusted under 35 U.S.C. 154(b) by 561 days.

(21) Appl. No.: 18/050,505

(22) Filed: Oct. 28, 2022

(65) Prior Publication Data

US 2023/0107297 A1 Apr. 6, 2023

Related U.S. Application Data

(63) Continuation of application No. PCT/JP2022/001641, filed on Jan. 18, 2022.

(30) Foreign Application Priority Data

Jan. 20, 2021 (JP) ................................ 2021-006799

(51) Int. Cl.
*E04H 9/14* (2006.01)
*B60P 3/36* (2006.01)
*B63C 9/06* (2006.01)
*B60P 3/10* (2006.01)

(52) U.S. Cl.
CPC ................ *E04H 9/145* (2013.01); *B60P 3/36* (2013.01); *B63C 9/06* (2013.01); *B60P 3/1041* (2013.01)

(58) Field of Classification Search
None
See application file for complete search history.

(56) References Cited

U.S. PATENT DOCUMENTS

| | | | | |
|---|---|---|---|---|
| 6,439,145 B1 * | 8/2002 | Mensch | B63C 13/00 114/61.18 |
| 8,454,399 B1 * | 6/2013 | Zelechonok | B60F 3/0069 440/12.51 |
| 2002/0088388 A1 * | 7/2002 | Mensch | B60F 3/0092 114/61.18 |

FOREIGN PATENT DOCUMENTS

| | | |
|---|---|---|
| JP | S49148728 U1 | 12/1974 |
| JP | 2008074385 A | 4/2008 |
| JP | 2014058296 A | 4/2014 |
| JP | 2014141084 A | 8/2014 |
| JP | 2015200164 A | 11/2015 |

(Continued)

OTHER PUBLICATIONS

International Search Report from International Application No. PCT/JP2022/001641 mailed Mar. 22, 2022.

*Primary Examiner* — Juan G Flores
(74) *Attorney, Agent, or Firm* — Shih IP Law Group, PLLC.

(57) ABSTRACT

Provided is a shelter floating device which enables an amphibious shelter to stably float on a surface of waters. The shelter floating device is provided on a lower surface of the amphibious shelter, and has a protruding floater, a Scott Russell mechanism unit, and a jack (operating means). The protruding floater is connected to the jack through the Scott Russell mechanism unit, while at the same time, being supported by a support device. The jack is fixed to the lower surface of the amphibious shelter. Consequently, by operating the jack, the protruding floater projects itself to an outside of side surfaces of the amphibious shelter along a perpendicular direction.

3 Claims, 9 Drawing Sheets

(56) References Cited

FOREIGN PATENT DOCUMENTS

| | | | |
|---|---|---|---|
| JP | 6675730 | B | 4/2020 |
| WO | 2020067354 | A1 | 4/2020 |

* cited by examiner

SHELTER FLOATING DEVICE

TECHNICAL FIELD

The present invention relates to a shelter floating device enabling an amphibious shelter capable of being towed by a traction vehicle to run on a road and floatable on a water surface to stably float on a water surface.

BACKGROUND

In order to protect human lives against a huge tsunami (tidal wave), it is one of the effective measures as a disaster prevention means to quickly evacuate evacuees to high grounds. However, in the event of a triple interrelated earthquake in the Tokai (East Sea), Tonankai (East South Sea), and Nankai (South Sea) regions, it is predictable that there will be areas where a tunami of 30 m high will strike in just five minutes after the earthquake occurs. In this instance, it will be extremely difficult for the evacuees to reach the high grounds in this short period of time. As a means to solve the difficulties, it has been proposed to prepare floating shelters floatable on a surface of the waters.

In the invention of Patent Document 1, there is provided a tsunami evacuation shelter that enables a shelter body to float when a tsunami arrives, and enables the shelter body to return to the vicinity of its original location after the tsunami leaves away. More specifically, disclosed is a floating shelter characterized in that the floating shelter has a shelter body that can accommodate evacuees and is made floatable on the waters, the shelter body is connected to a drift-preventable connecting portion which is fixedly secured to the ground, and a protruding length of the shelter body from the ground increases with an increase of the water level, and the protruding length from the ground decreases with a decrease of the water level.

In the invention of Patent Document 2, disclosed is a low-price evacuation life-saving capsule which can be purchased by many homes, and placed in a corner of the garden, and enabling evacuees to evacuate from a flood damage caused by, for example, tsunami by accommodating evacuees into a lightweight and strong capsule in the event of the flood. More specifically, a capsule body having a square-shaped general configuration and a constricted lower portion is integrally molded with resin. At an upper portion of the capsule body, provided is a framework covered with a waterproof sheet cover. The waterproof sheet cover has an entrance and exit door, and the capsule body has an inner space in which at least four adults can be accommodated by sitting with their knees folded with the help of seat belts. A weight to lower the center of gravity and a pedestal provided with casters are attached to the lower portion of the capsule body.

CITATION LIST

Patent Literature

Patent Literature 1: JP2008-74385
Patent Literature 2: JP2014-58296

SUMMARY OF THE INVENTION

Technical Problem

However, the floating shelters disclosed in Patent Documents 1 and 2 are not intended for running on roads.

Therefore, in order to install the shelter at a predetermined installation site, it is necessary to load the shelter onto a transportation vehicle such as a truck, and transport the shelter to the installation site to unload the shelter body, and then locate the shelter on the foundation place. Moreover, the evacuation space is confined, and it is intended to be used only in the event of disasters, and is not intended to be used in normal times.

When moving an amphibious shelter along a road, the length in the width direction of the shelter is restricted by the limitation of the lane width, so the length in the width direction has to be determined shorter than the length in the rectilinear direction which is perpendicular to the width direction. Therefore, upon floating the amphibious shelter on the surface of the waters, it is assumed that the amphibious shelter will roll around an axis in the rectilinear direction due to the influence of the waves so as to lose the stability of the amphibious shelter.

The present invention has been made in view of these problems, and provides a shelter floating device that enables an amphibious shelter to stably float on a surface of the waters.

Solution to Problem

The invention for solving the above-mentioned problems is a shelter floating device which enables an amphibious shelter to float on a surface of waters, said amphibious shelter being capable of being towed by a traction vehicle to travel on a road. The shelter floating device has a protruding floater that imparts a buoyancy to the shelter, and has a projecting device which is provided to project said protruding floater outside of a side surface of said amphibious shelter along a first direction in a planar view.

According to this configuration, the protruding floater is projected outside of a side surface of said amphibious shelter along a first direction in a planar view. This make it possible to suppress a rolling motion caused by the influence of waves of the waters upon floating the shelter on the surface of the waters. In addition, since the shelter can run on the road by being towed by a traction vehicle, it is possible to easily install the shelter at desired places depending on various situations, and also possible to use the shelter as a travel trailer during normal times. By installing the shelter in the vicinity of the place of residence such as the garden of the home, it is possible for evacuees to evacuate in a short period of time in the event of disasters. Since the shelter is floatable on the surface of the waters, it is possible for the evacuees to evacuate when a tsunami occurs.

Preferably, it is characterized in that a support device is provided to support the protruding floater.

According to this configuration, the protruding floater projects outside while supported by the support device. This makes it possible to prevent the protruding floater from being significantly displaced due to the influence of the waves developed on the surface of the waters when the protruding floater projects out of the side surface of the shelter outward along the first direction in the planar view.

Preferably, the projecting device has a pair of Scott Russell mechanism units and an operating means to operate the Scott Russell mechanism units. The Scott Russell mechanism unit has a first link having one end rotatably fixed to said protruding floater and having the other end adapted to move along a second direction which is perpendicular to said first direction upon activating said operating means; a second link having one end rotatably fixed to a central portion of said first link and having the other end rotatably fixed to a lower surface of said amphibious shelter. When said operating means is activated to move said other end of said first link along an imaginary line which passes through said other end of said second link and extends along said second direction, said one end of said first link moves along said first direction.

According to this configuration, the operating means projects the projecting device through the Scott Russell mechanism unit, so that the operating means is prevented from being directly affected by the waves. This enables the projecting device to smoothly project.

Preferably, the protruding floater is characterized by having an inflatable balloon inflated when the protruding floater is fully projected.

According to this configuration, the protruding floater is characterized by having the inflatable balloon inflated when the protruding floater is fully projected. It is possible to impart a greater amount of buoyancy to the amphibious shelter.

DESCRIPTION OF EMBODIMENT

Hereinafter, embodiments of the present invention will be described in detail with reference to the drawings.

Figure 1A:
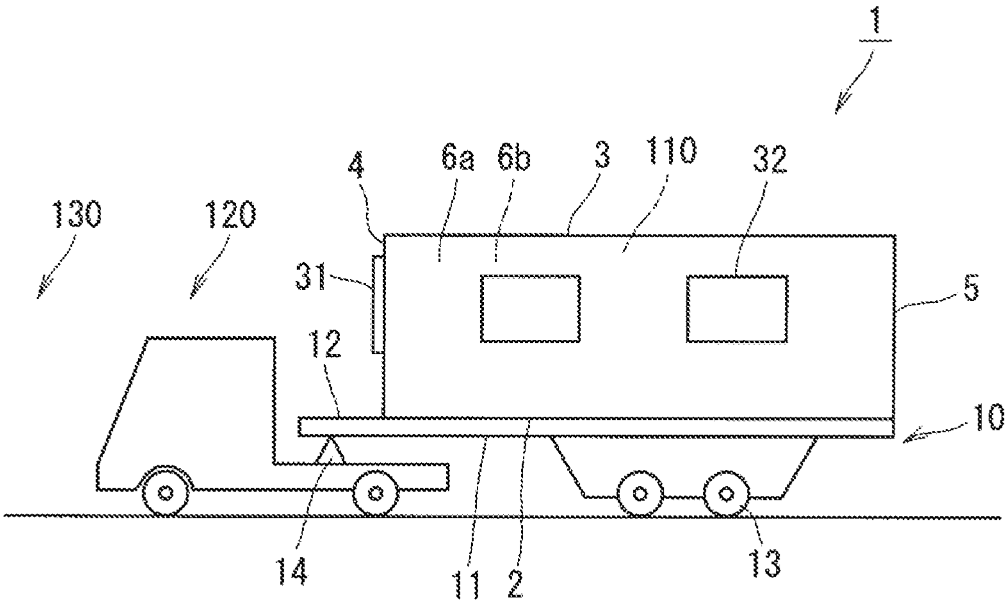
FIG. 1*a* is a side view shown for explaining a state of a shelter towed by a traction vehicle to run on a road.
Figure 1B:
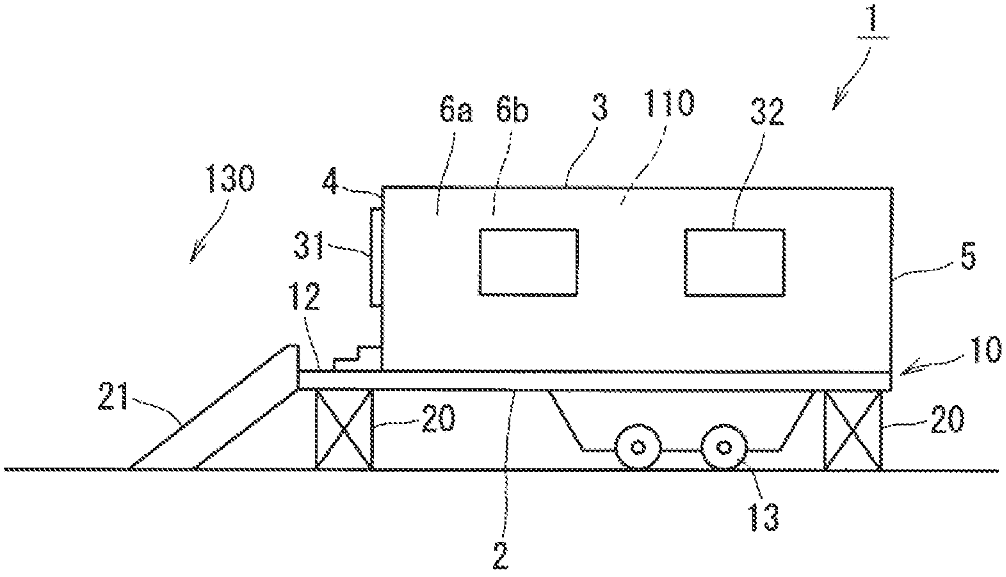
FIG. 1*b* is a side view shown for explaining a state of the shelter installed on the land.

A shelter 1 according to the present invention is an amphibious shelter, which is fixed to a carriage 10. When moving the shelter 1 along a road, a fulcrum 14 provided on the carriage 10 is rotatably connected to a traction vehicle 120 as shown in FIG. 1(*a*). This enables the shelter 1 to be towed by the traction vehicle 120 so as to travel on the road. Since roads are constructed according to certain structural standards, "general limit values" are set for each size of vehicles traveling on roads in order to protect the structure of the roads and prevent traffic hazards. For example, the "general limit values" in Japan is 2.5 m in width, 12.0 m in length and 3.8 m in height. When transporting the shelter 1 by land, it is preferable that the shelter 1 can be driven on roads without obtaining special permits, namely, the shelter 1 should be driven in accordance with the "general limit values". Therefore, it is preferable that the outer dimensions of the shelter 1 in the embodiment of the invention fall within the limits of the "general limit values".

The shelter 1 is in the form of a substantially rectangular parallelepiped housing having a lower surface 2, an upper surface 3, a front surface 4, a rear surface 5, and side surfaces 6*a*, 6*b*. The housing of the shelter 1 has an internal space 110 which serves as an evacuation space in the event of disasters. The internal space 110 can be also used as a movable space when the shelter 1 is towed by a traction vehicle 120, and can be further used as a living space, an office space and so forth when placed on the ground. A door 31 is provided on the front surface 4 of the shelter 1, while windows 32 are provided on the corresponding side surfaces 6*a* and 6*b* of the shelter 1.

The carriage 10 has a fixing portion 11 to fixedly secure the shelter 1, a deck portion 12 for going in and out through the door 31 and wheels 13 placed on the ground. The shelter 1 secured to the fixing portion 11 has a structure that can be separated from the carriage 10. This facilitates repairing procedures when either or both of the shelter 1 and the carriage 10 are subjected to damage. Moreover, when the shelter 1 and the carriage 10 are separated, it is possible to use the shelter 1 individually as an evacuation facility.

The door 31 is a hinged door rotatably provided to open toward a direction of an external space 130 and is placed adjacent to the deck portion 12. This facilitates a moving between the deck portion 12 and the internal space 110 through the door 31. A ring-shaped packing (not shown) is provided on an outer periphery of the door 31 to ensure a water-tightness when the door 31 is closed.

The windows 32 are provided with a shutter and are made of bulletproof glass in order to protect the windows 32 against the damage even when tsunami-accompanied flotsam hits the windows 32.

Upon installing the shelter 1 on the land as shown in FIG. 1(*b*), a foundation 20 and stairs 21 are additionally placed, while maintaining the shelter 1 fixed to the carriage 10. It is possible to stably place the shelter 1 on the ground by the support of the foundation 20 and the wheels 13. Further, by connecting the stairs 21 to the deck portion 12, it becomes possible to ensure a smooth access through the door 31. In this embodiment of the invention, the shelter 1 is placed on the ground, while fixed to the carriage 10, however, it is to be noted that the shelter 1 may be separated from the carriage 10 and placed on the ground alone.

Figure 2A:
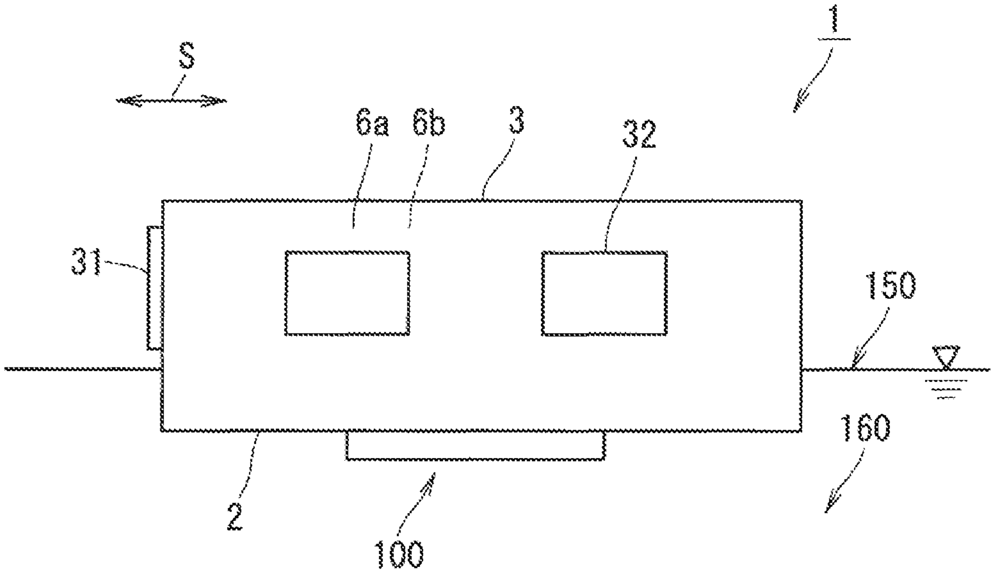
FIG. 2*a* is a side view shown to explain a state of the shelter floating on a surface of waters.
Figure 2B:
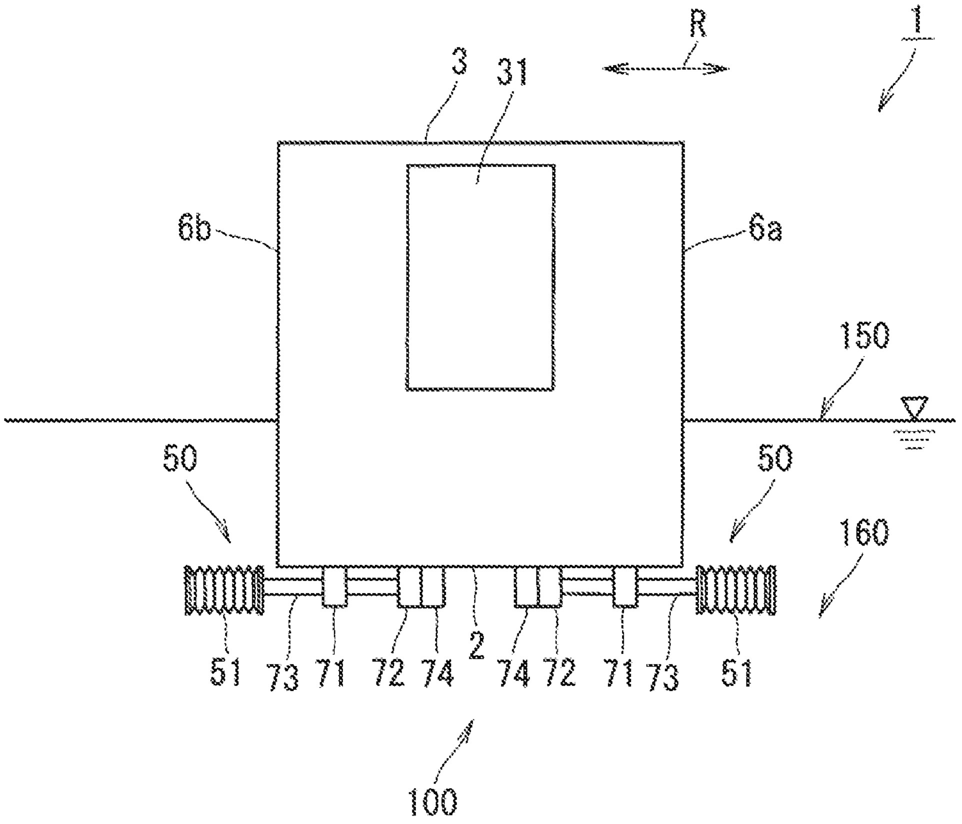
FIG. 2*b* is a front view of the shelter floating on the surface of the waters.

As shown in FIG. 2(*a*), a shelter floating device 100 (hereinafter referred to as floating device 100) is provided on the lower surface 2 of the shelter 1. The floating device 100 is positioned in the waters 160 and subjected to a buoyancy from the waters 160 so as to float the shelter 1 on a surface 150 of the waters 160. When the shelter 1 floats on the surface 150 of the waters 160 as shown in FIG. 2(*b*), the shelter 1 is separated from the carriage 10 and protruding floaters 50 are projected outward along a perpendicular direction R (first direction) and inflatable balloons 51 are inflated by filling the inflatable balloons 51 with urethane foam. In this instance, the rectilinear direction S (second direction) is designated as a direction along the side surfaces 6*a* and 6*b*. Therefore, the perpendicular direction R (first direction) is a direction forming right angles against the rectilinear direction S extending along the side surfaces 6*a*, 6*b*.

Since the urethane foam has a smaller specific gravity than that of the waters 160, a lifting force develops upward due to the buoyancy when the inflatable balloon 51 is positioned in the waters 160. In addition, since the urethane foam has a predetermined amount of cushioning effect, it is possible to mitigate an impact, to which the inflatable balloon 51 is subjected from a collision force of drifting objects carried in accompany with the tsunami by way of example.

In this embodiment of the invention, the inflatable balloon 51 is inflated by filling the balloon 51 with the urethane foam. Instead of the urethane foam, the inflatable balloon 51 may be inflated by filling the balloon 51 with inert gas. In this instance, it is possible to reduce the filling period of time compared to the case in which the inflatable balloon 51 is filled with the foamed urethane. Further, when filled with the urethane foam, the inflatable balloon 51 cannot be reused, however, when filled with the inert gas, the inflatable balloon 51 can be reused by letting the inert gas out of the inflatable balloon 51.

Due to the "general limit values" mentioned hereinbefore, the shelter 1 is more limited in width than in length. Therefore, upon floating the shelter 1 on the surface 150 of waters 160, the shelter 1 tends to roll around an axis along the rectilinear direction S so as to be easily overturned. In this embodiment of the invention, with the protruding floater 50 projected outward and the inflatable balloon 51 inflated, it is possible to dimensionally increase a spaced distance of the floating device 100 in the perpendicular direction R so as to prevent the shelter 1 from being rolled and overturned.

The door 31 is preferably placed above a level of the surface 150 of the waters 160, so that the door 31 can be easily opened and closed without being affected by water pressure, while at the same time, avoiding the waters 160 from intruding through the door 31. It is also preferable to locate the inflatable balloon 51 entirely in the waters 160 so as to ensure a greater amount of the buoyancy.

Figure 3:
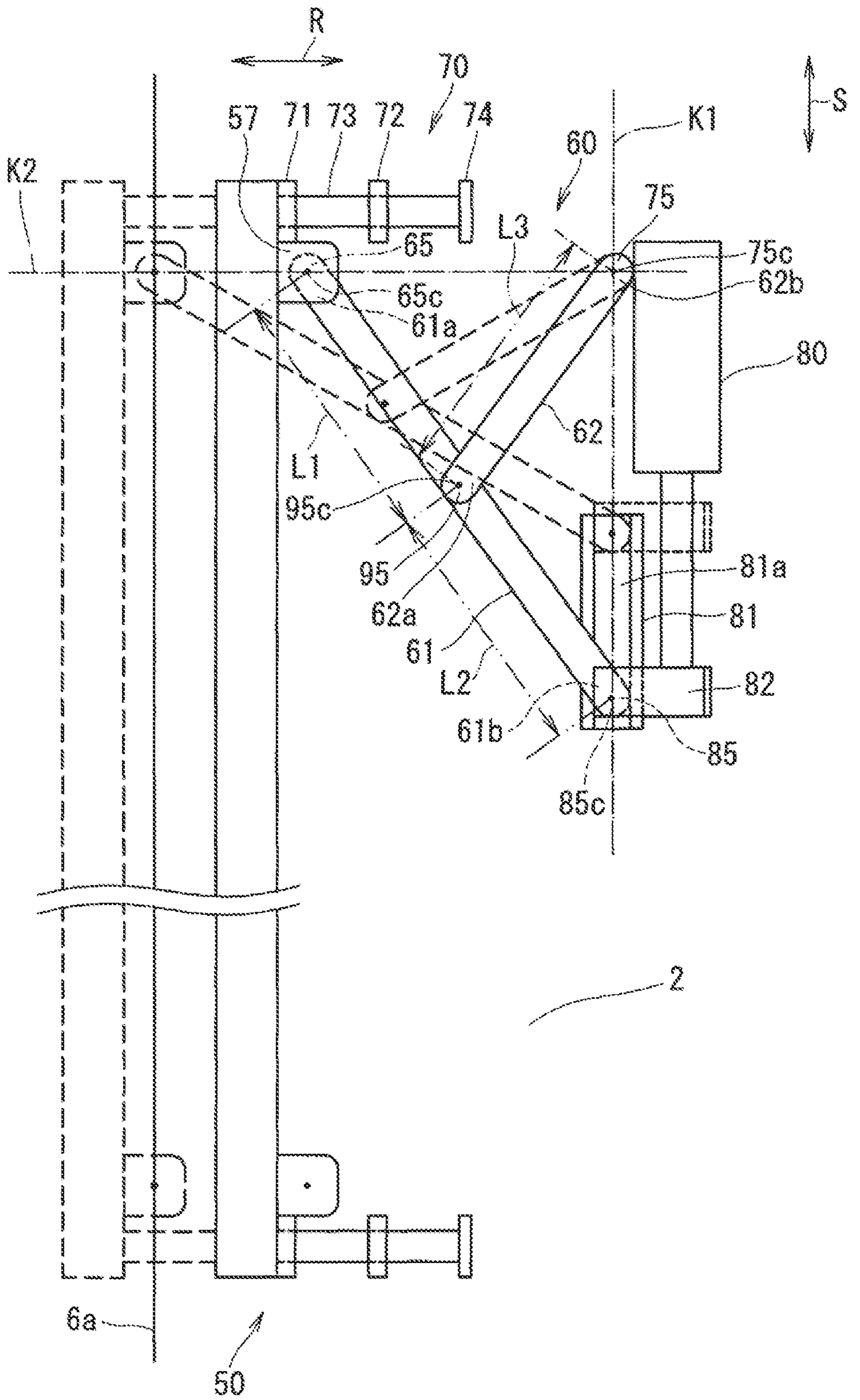
FIG. 3 is a bottom view shown to explain a protruding mechanism of the protruding floater.

As shown in FIG. 3, the protruding floater 50 is supported by a pair of support devices 70, 70 and is connected to jacks 80, 80 (operating means) through Scott Russell mechanism units 60, 60 (hereinafter referred to as unit 60). The jacks 80, 80 and the Scott Russell mechanism units 60, 60 serve as a projecting device. Each of the jacks 80 is fixedly secured to the lower surface 2 of the shelter 1. By operating the jack 80, it becomes possible to project the protruding floater 50 out of the side surfaces 6*a*, 6*b* outward along the perpendicular direction R. It is to be noted that one of the paired units 60, 60 and one of the paired jacks 80, 80 are omitted in FIG. 3.

Each of the units 60 has a first link 61 and a second link 62. One end 61*a* of the first link 61 is fixed to an end portion of the protruding floater 50 by way of a rotatable portion 65. The other end 61*b* of the first link 61 is rotatably fixed to the jack 80 by way of a rotatable portion 85.

The rotatable portion 85 is slidably fitted in a guide groove 81*a* defined in a guide 81. The guide groove 81*a* extends along the rectilinear direction S so as to make the rotatable portion 85 movable along the rectilinear direction S.

One end 62*a* of the second link 62 is rotatably fixed to the first link 61 by way of a rotatable portion 95. The other end 62*b* of the second link 62 is rotatably fixed to the lower surface 2 of the shelter 1 by way of a rotatable portion 75.

A distance L1 is a distance from a rotational center axis 65*c* (a rotational center axis of the rotatable portion 65) to a rotational center axis 95*c* (a rotational center axis of the rotatable portion 95). A distance L2 is a distance from the rotational center axis 95*c* to a rotational center axis 85*c* (a rotational center axis of the rotatable portion 85). A distance L3 is a distance from the rotational center axis 95*c* to a rotational center axis 75*c* (a rotational center axis of the rotatable portion 75). These distances L1, L2 and L3 are to be mutually identical. An imaginary line K1 which passes through the rotational center axis 85*c* and the rotational center axis 75*c* extends along the rectilinear direction S. Another imaginary line K2 which passes through the rotational center axis 65*c* and the rotational center axis 75*c* extends along the perpendicular direction R.

Figure 4:
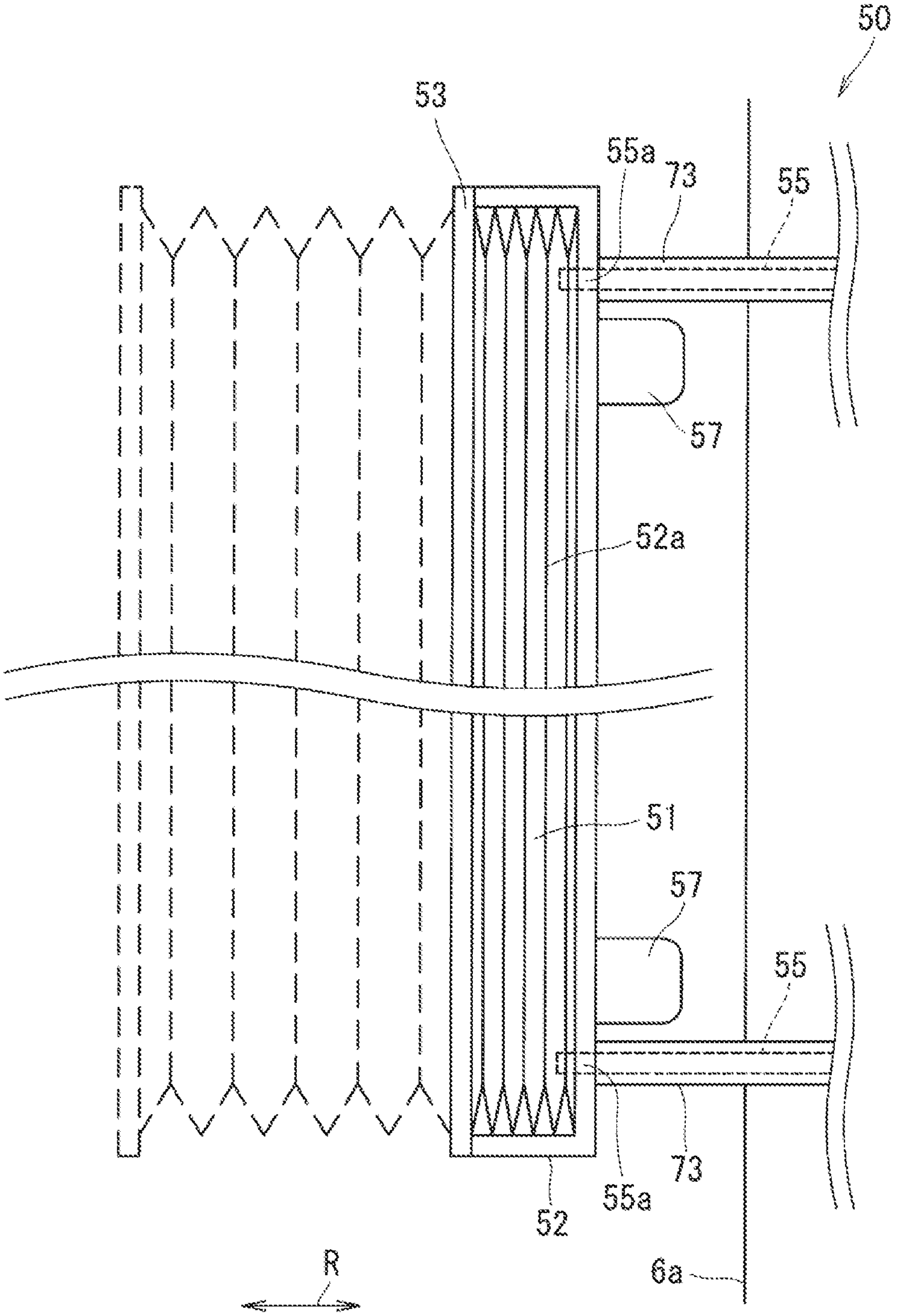
FIG. 4 is a bottom view shown to explain the protruding floater.

As shown in FIG. 4, the protruding floater 50 has an inflatable balloon 51 and an accommodation housing 52 which is provided to accommodate the inflatable balloon 51 (the unit 60 is omitted in FIG. 4). In the accommodation housing 52, an accommodation recess 52*a* is defined to accommodate the inflatable balloon 51 with the balloon 51 folded in a bellows-like configuration. The accommodation recess 52*a* is a recess that opens toward a direction in which the inflatable balloon 51 is projected outward. When the inflatable balloon 51 is accommodated in the accommodation recess 52*a*, the accommodation recess 52*a* is closed by a protective plate 53 which is placed at a leading end of the inflatable balloon 51.

The accommodation housing 52 has a supply pipe 55 connectedly provided to supply a urethane foam as a filler medium to the inflatable balloon 51. One end of the supply pipe 55 penetrates into the inflatable balloon 51 through a hollow inside of a fixing bar 73 and an opening portion 55*a*, the latter of which is provided on the accommodation housing 52. The other end of the supply pipe 55 is connected to a cylinder (not shown) which serves as a container filled with the urethane foam. By filling the inflatable balloon 51 with the urethane foam from the cylinder through the supply pipe 55, the balloon 51 is inflated and projects outside of the side surface 6*a* of the shelter 1 along the perpendicular direction R as seen in planar view. The inflatable balloon 51 is inflated when the protruding floater 50 fully projects.

Figure 5:
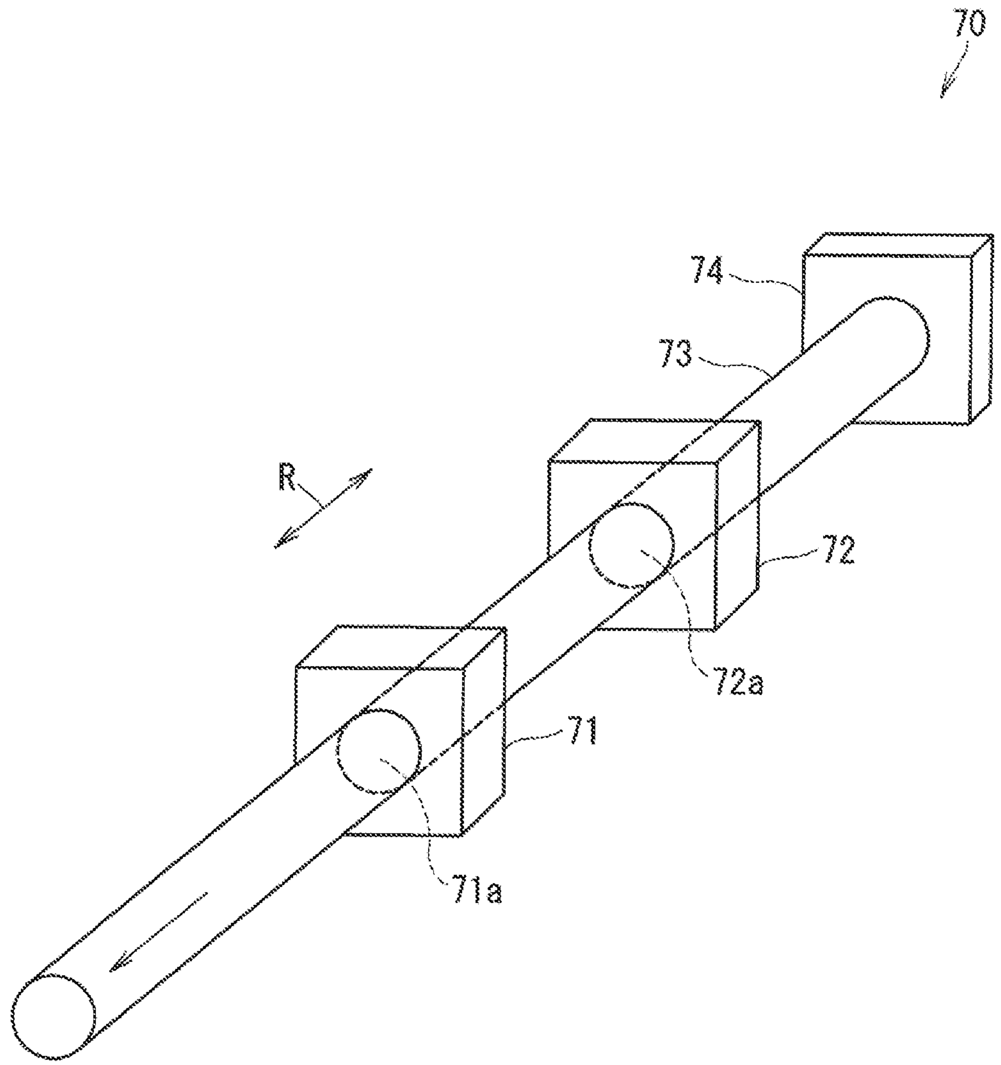
FIG. 5 is a perspective view of a support device.

As shown in FIGS. 3 and 5, a support device 70 has fixing members 71, 72 each fixed to the lower surface 2 of the shelter 1, and further has a fixing bar 73 which passes through passage holes 71*a* and 72*a* each provided on the corresponding fixing members 71, 72. The fixing bar 73 is in the form of cylindrical configuration with one end fixed to the protruding floater 50. To the other end of the fixing bar 73, a stopper 74 is fixedly secured. The holes 71*a* and 72*a* are dimensionally determined so as to allow the fixing bar 73 to slide therethrough freely. The stopper 74 is to restrict the protruding floater 50 from projecting outside along the perpendicular direction R. More specifically, upon moving the fixing bar 73 along the perpendicular direction R, the stopper 74 makes contact with the fixing member 72, thereby restricting the protruding floater 50 from projecting unnecessarily outward along the perpendicular direction R. The fixing bar 73 is to suppress a displacement of the protruding floater 50 caused by the wave power developed on the surface 150 of the waters 160 or the like. Specifically, when the protruding floater 50 is about to displace by the wave power or the like, the fixing members 71, 72 apply countervailing external forces to the fixing bar 73 so as to restrain the protruding floater 50 from being displaced. By restraining the displacement of the fixing bar 73, it becomes possible to suppress the protruding floater 50 from being unnecessarily displaced.

Figure 6:
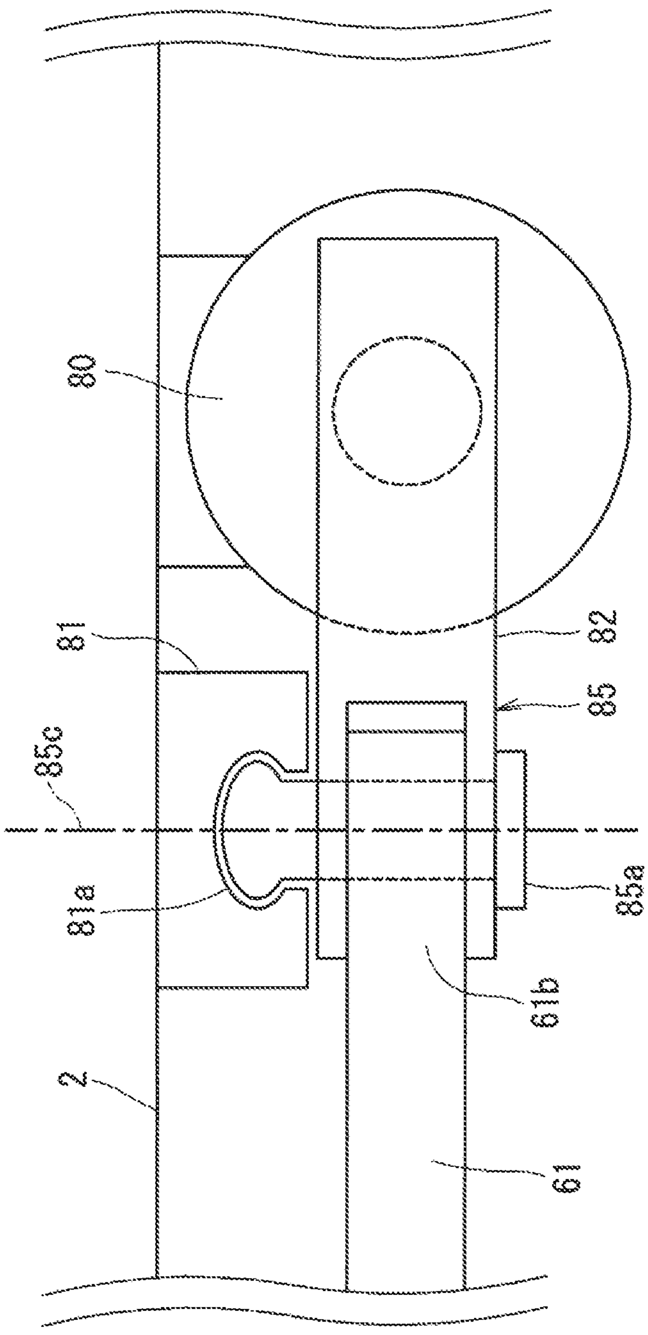
FIG. 6 is a rear view shown to explain a connected state of the other end of the first link.

As shown in FIG. 6, the other end 61*b* of the first link 61 is rotatably connected to the jack 80 through the rotatable portion 85. The first link 61 and a bracket 82 are mutually rotated around the rotational center axis 85*c* by way of a pin 85*a*. The bracket 82 is fixedly secured to the jack 80. The pin 85*a* is slidably fitted into the guide groove 81*a* defined in the guide 81. The guide groove 81*a* extends along the rectilinear direction S. When the jack 80 is operated, the bracket 82 moves along the rectilinear direction S. Along with the movement of the bracket 82, the other end 61*b* of the first link 61 moves along the rectilinear direction S with the rotational movement of the rotatable portion 85 accompanied.

Figure 7:
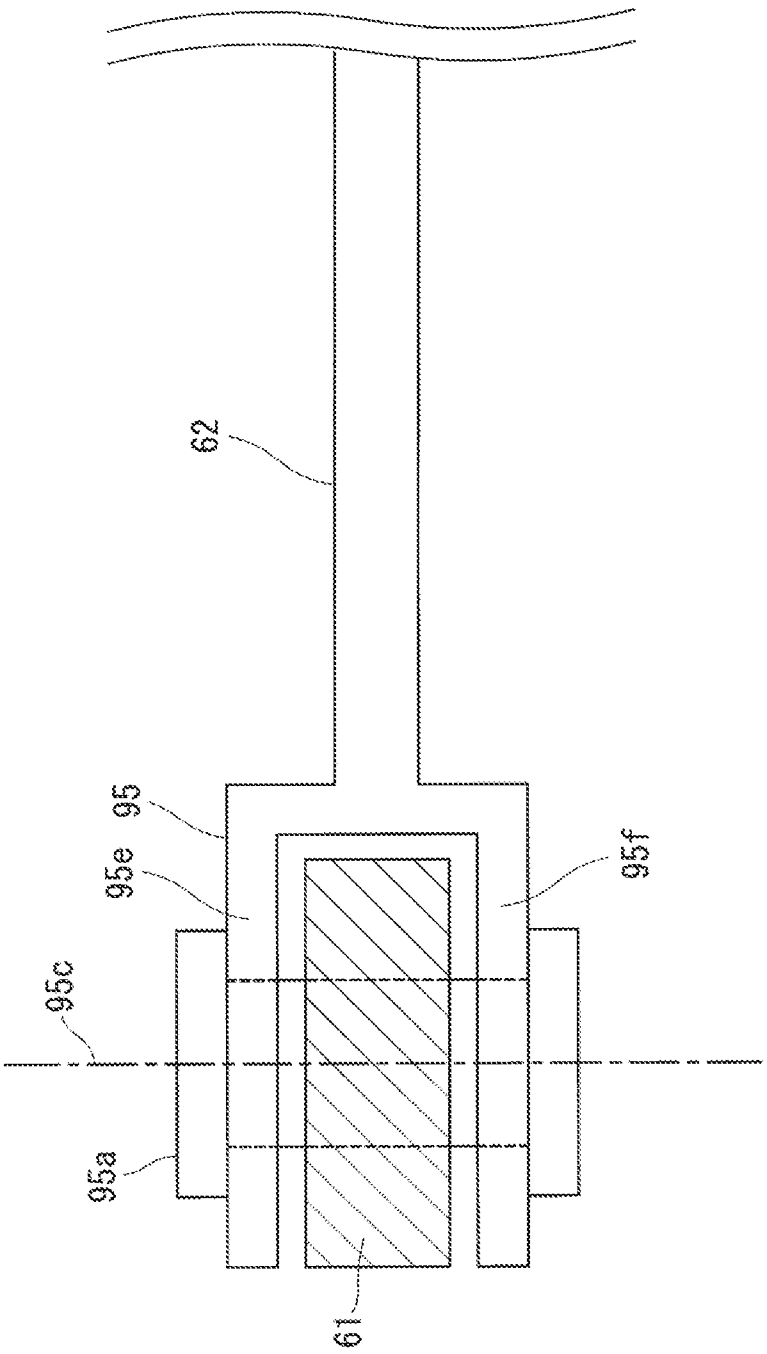
FIG. 7 is a cross sectional view shown to illustrate a connection structure between a first link and a second link.

An intermediate portion of the first link 61 and one end 62*a* of the second link 62 are structured so as to be mutually rotatable about the rotational center axis 95*c* (refer to FIG. 3). As shown in FIG. 7, the second link 62 is bifurcated at the rotatable portion 95 to form upper and lower pieces 95*e*, 95*f* which sandwiches the first link 61 therebetween. Furthermore, a pin 95*a* is penetrated through holes provided on the upper and lower pieces 95*e*, 95*f*, thereby making a central axis of the pin 95*a* serve as the rotational center axis 95*c*.

Figure 8:
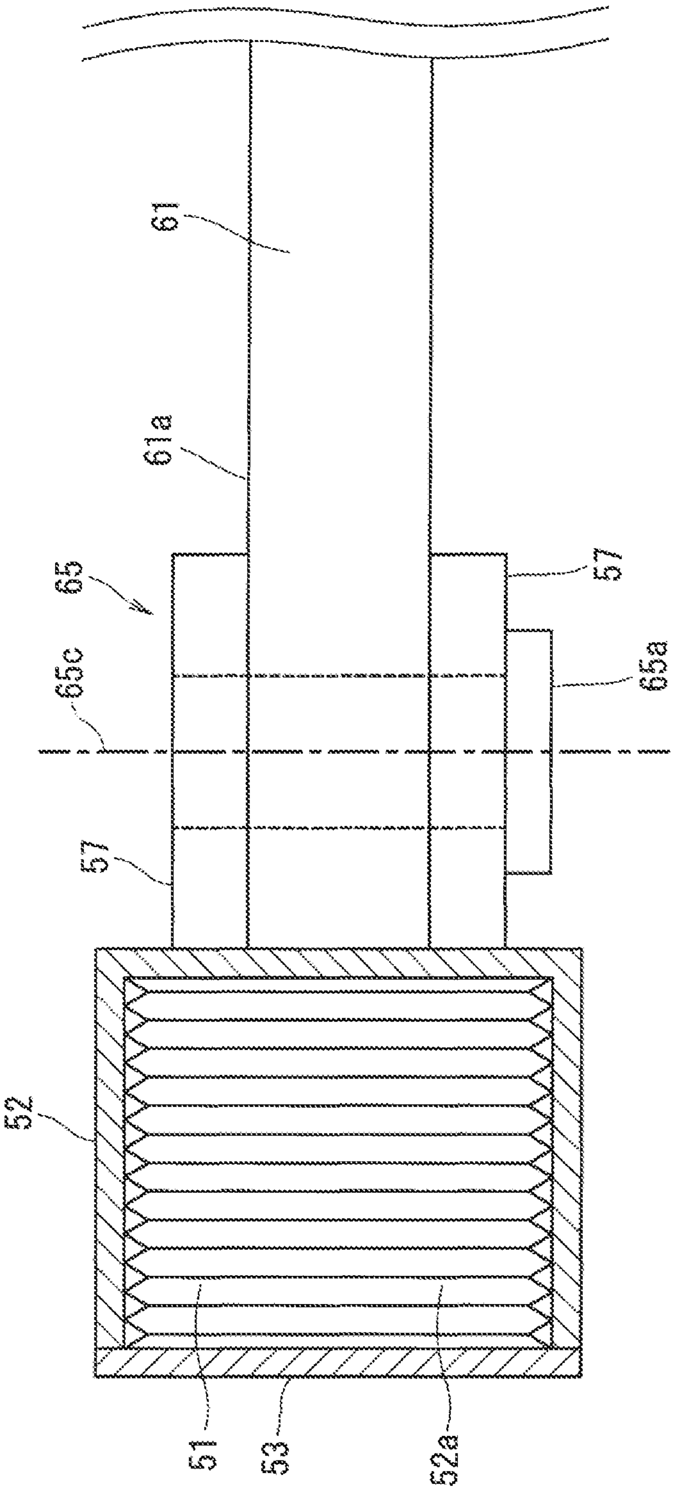
FIG. 8 is a rear view shown to explain the connection structure between the first link and the protruding floater.

As shown in FIG. 8, the rotatable portion 65 has a pair of clamping plates 57, 57 to sandwich one end 61*a* of the first link 61. Each of the clamping plates 57 is fixed to the accommodation housing 52. The rotatable portion 65 is provided at one end portion of the accommodation housing 52. A fixing bar 73 is fixed to one further end portion of the accommodation housing 52 (refer to FIG. 3). Further, a pin 65*a* is penetrated into a hole provided in a region where the first link 61 is sandwiched between the clamping plates 57, 57. This makes a central axis of the pin 65*a* serve as the rotational center axis 65*c*, so that the first link 61 allows its one end 61*a* to move in the perpendicular direction R with the rotational movement around the rotational center axis 65*c* accompanied.

Figure 9:
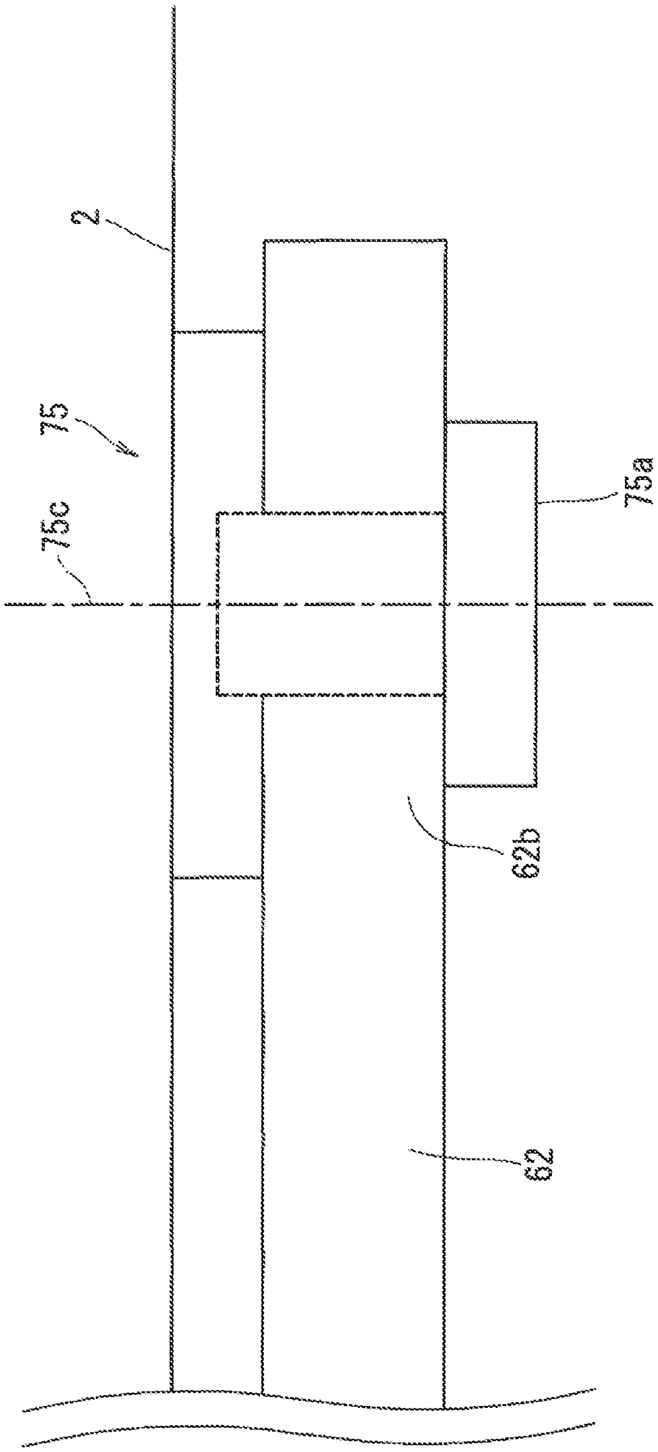
FIG. 9 is a side view shown to illustrate a state in which the second link is fixed to a lower surface of the shelter.

As shown in FIG. 9, the rotatable portion 75 has a pin 75*a* which is adapted to rotatably fix the other end 62*b* of the second link 62. The pin 75*a* is fixed to the lower surface 2 of the shelter 1, while passing through a hole which is provided at the other end 62*b* of the second link 62. This renders a central axis of the pin 75*a* to serve as the rotational center axis 75*c*, so that the other end 62*b* of the second link 62 rotationally moves around the rotational center axis 75*c*.

With reference to FIG. 3, how the unit 60 and the protruding floater 50 work upon operating the jack 80 will be described.

Upon operating the jacks 80, 80 connected respectively to the pair of units 60, 60 by way of the rotatable portions 85, 85, the operation causes the rotatable portions 85, 85 to move at an equal speed in the direction in which a distance therebetween increases along the way in which the imaginary line K1 extends. Along with the above action, the rotatable portions 65, 65 move at an equal speed toward an outside of the side surface 6*a* along the way in which the imaginary line K2 extends. This makes it possible to project the protruding floater 50 outward from the side surface 6*a* of the shelter 1 along the perpendicular direction R.

INDUSTRIAL APPLICABILITY

A floating device according to the present invention enables a shelter to be used for amphibious purposes, by being attached to the shelter. This enables the shelter to be used for multi-purpose usage such as evacuation facilities, offices, etc., on the land and on a surface of waters, so as to ensure an enough industrial applicability.

REFERENCE NUMERALS

1: shelter
50: protruding floater
51: inflatable balloon
60: unit (Scott Russell mechanism unit, projecting device)
61: first link
62: second link
61*a*, 62*a*: one end
61*b*, 62*b*: other end
70: support device
80: jack (operation means)
100: floating device (shelter floating device)
120: traction vehicle
R: perpendicular direction (first direction)
S: rectilinear direction (second direction)

What is claimed is:

1. A shelter floating device which enables an amphibious shelter to float on a surface of waters, the amphibious shelter configured to be towed by a traction vehicle to travel on a road, the shelter floating device comprising:

a protruding floater which imparts a buoyancy to the amphibious shelter; and a projecting device which is provided to project the protruding floater outside of a side surface of the amphibious shelter along a first direction in a planar view, wherein the projecting device comprises a pair of Scott Russell mechanism units and operating means to operate the pair of Scott Russell mechanism units, and each of the pair of Scott Russell mechanism units including:

a first link comprising one end rotatably fixed to the protruding floater, and another end adapted to move along a second direction which is perpendicular to the first direction upon activating the operating means; and a second link comprising one end rotatably fixed to a central portion of the first link, and another end rotatably fixed to a lower surface of the amphibious shelter;

wherein when the operating means are activated to move the another end of the first link along an imaginary line which passes through the another end of the second link and extends along the second direction, and the one end of the first link moves along the first direction.

2. The shelter floating device according to claim 1, wherein a support device is provided to support the protruding floater.

3. The shelter floating device according to claim 1, wherein the protruding floater comprises an inflatable balloon inflated when the protruding floater is fully projected.

* * * * *